United States Patent
Theimer et al.

(10) Patent No.: US 8,616,980 B2
(45) Date of Patent: Dec. 31, 2013

(54) METHOD AND DEVICE FOR GENERATING A GAME DIRECTORY ON AN ELECTRONIC GAMING DEVICE

(75) Inventors: Wolfgang Theimer, Bochum (DE);
Peter Decker, Marl (DE); Axel Meyer, Oulu (FI); Karsten Lehn, Kamen (DE); Olaf Joeressen, Meerbusch (DE); Tomi Huttula, Bochum (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/358,490

(22) Filed: Jan. 25, 2012

(65) Prior Publication Data

US 2012/0270659 A1    Oct. 25, 2012

Related U.S. Application Data

(63) Continuation of application No. 10/574,876, filed as application No. PCT/IB03/04477 on Oct. 10, 2003, now Pat. No. 8,128,501.

(51) Int. Cl.
*A63F 9/24*    (2006.01)

(52) U.S. Cl.
USPC .......................................................... 463/42

(58) Field of Classification Search
USPC .......................................................... 463/42
See application file for complete search history.

(56) References Cited

U.S. PATENT DOCUMENTS

| | | | |
|---|---|---|---|
| 2002/0142845 A1 | 10/2002 | Whitten et al. | |
| 2003/0005449 A1 | 1/2003 | McKenna et al. | |
| 2003/0176213 A1 | 9/2003 | LeMay et al. | |
| 2003/0186734 A1 | 10/2003 | LeMay et al. | |

FOREIGN PATENT DOCUMENTS

| | | | |
|---|---|---|---|
| AU | 1268502 | A | 5/2002 |
| CA | 2421541 | A1 | 9/2003 |
| CN | 1303048 | A | 7/2001 |
| CN | 1309366 | A | 8/2001 |
| CN | 1399206 | A | 2/2003 |
| EP | 1239379 | A2 | 9/2002 |
| EP | 1338989 | A1 | 8/2003 |
| JP | 2002-358221 | A | 12/2002 |
| WO | WO 02/35414 | A1 | 5/2002 |

OTHER PUBLICATIONS

Chinese Office Action for related Chinese Patent Application No. 200380110506.8 dated Aug. 26, 2010, pp. 1-7.
Chinese Office Action for related Chinese Patent Application No. 200380110506.8 dated Mar. 17, 2011, pp. 1-11.
Chinese Office Action for related Chinese Patent Application No. 200380110506.8 dated Mar. 20, 2009, pp. 1-15.
Chinese Office Action for related Chinese Patent Application No. 200380110506.8 dated Sep. 15, 2011, pp. 1-5.

(Continued)

*Primary Examiner* — Corbett B Coburn
(74) *Attorney, Agent, or Firm* — Ditthavong Mori & Steiner, P.C.

(57) ABSTRACT

A method and a device for simplifying the forming of game parties in wireless communication networks is provided. A game directory is generated comprising all available (multi-player) games on a mobile device and exchanging said information between different gaming devices. Said game directory is generated by querying a memory accessible by said electronic gaming device for electronic games available for execution on, and generating a game directory having entries for each electronic game which is determined. Said game directory is then exchanged to visualize all available games to all potential game partners.

20 Claims, 3 Drawing Sheets

(56) References Cited

OTHER PUBLICATIONS

Chinese Office Action for related Chinese Patent Application No. 200380110506.8 dated Sep. 4, 2009, pp. 1-12.
Chinese Office Action for related Chinese Patent Application No. 200380110506.8, Apr. 19, 2010, China, pp. 1-6.
European Office Action for related European Patent Application No. 03 748 433.4-2218 dated Aug. 9, 2011, pp. 1-4.
International Search Report for related International Patent Application No. PCT/IB2003/004477 dated Apr. 29, 2004, pp. 1-3.

| Game name: | possible Players | Played x times |
|---|---|---|
| Game 1 | ~~IIII~~ | 7 |
| Game 2 | III | 15 |
| Game 3 | IIII | -- |
| ....... | .... | ...... |

Fig. 3

| Game NR. | | Player nr |
|---|---|---|
| Game 1 | | Player 1 |
| Game 2 | | Player 2 |
| Game 3 | | Player 3 |
| Game 4 | | Player 4 |

Fig. 4

| Player\Game | P1 Jessy | P2 Sunny | P3 Berny |
|---|---|---|---|
| G1 Football | X | | X ☹ |
| G2 Icehockey | X | X | X |
| G3 Solar travel | | X ☺ | X ☺ |
| G4 Moon Race | X ☹ | X | |
| G4 Star Ways | X | x | x |

Fig. 5

| Character\Spaceship | Jack T. | Joe K.R. | Sue C.Q. | Luis WU | Lem Ing. |
|---|---|---|---|---|---|
| Orion | | | P1 | | |
| Nostromo | | | | | |
| Hot Needle | | | | P3 | |
| NCC4712 | P2 | | | | |
| Solar Star | | | | | |

Fig. 6

METHOD AND DEVICE FOR GENERATING A GAME DIRECTORY ON AN ELECTRONIC GAMING DEVICE

RELATED APPLICATIONS

This application is a continuation of U.S. patent application Ser. No. 10/574,876 filed on Oct. 10, 2006, which is a U.S. National Stage of PCT/IB03/04477 filed on Oct. 10, 2003, the entireties of which are incorporated herein by reference.

FIELD OF THE INVENTION

The present invention relates to a method for simplifying the forming of game parties in wireless communication networks. The present invention is based on generating a game directory comprising all available (multi-player) games on a mobile device and exchanging said information between different gaming devices.

The present invention further relates to the initiation of multi-player gaming between different communication devices and especially to the identification of suitable game partners or team-mates.

BACKGROUND OF THE INVENTION

The area of multiparty gaming is currently expanding from the fixed console and PC domain to mobile devices. Playing games with multiple partners implies some communications between the players in order to agree on a game, its options, the roles of the participants and teams. This document focuses on the initiation phase of a multiparty game and outlines a simple and fast approach to start a game. It can be best applied in the mobile domain, but is not limited to mobile devices.

Multiparty gaming is currently existing in two different domains:

First, in the stationary console and PC gaming business multiparty gaming translates to LAN and Internet-based games, where a game server collects the request from the various game clients and informs the participants about their status. Typically, a lobby room is used to collect the participants before entering the game. The game server hosts the game and can transfer game data to the connected clients.

Second, presently available mobile game consoles can be physically interconnected by linking cables, which require that the members of a game party are actually present. Thus, the game party can talk about the available electronic games and can decide by vocal negotiation about the game to be played. Certain games do not need to be installed on each connected device as long as one terminal can deliver the content via the link cables to the others. Special game modes can only be played with multiple game cartridges.

In case of multi-player gaming in a wireless environment said gaming partners may not even be within a distance in which a technically unassisted vocal communication is possible.

The document EP 1066868 A2 'Multi-player Game System using mobile telephone and game units' filed by the applicant discloses an electronic game system between different mobile game units. The connection between the game units may be provided via a public land mobile network or via short-range radio connections. The document discloses the setup of connections for wireless multi-player gaming. In the disclosed scenario the terminal devices can search or scan for actually running games in a limited area.

All the above approaches for a multi-player game party setup have in common that they are not suitable for the use with wirelessly connected or mobile terminal devices, as a communication and negotiation necessary to find a game partner cannot be provided by the conventional systems.

SUMMARY OF THE INVENTION

Playing games with multiple partners is attractive for garners since it enables more sophisticated game plots and unexpected actions in a game due to the human spontaneity. The advantage of human interaction in a game also implies the objects of the present invention.

An object of the present invention is to provide a method and a device to enable a player to inform his gaming companions and/or a known gaming community about his desire to play a multiparty game.

Another object of the present invention is to provide an easy way to negotiate roles and options when initiating a multi-player or multiparty game.

Yet another abject of the present invention is to provide a solution in a situation that the gaming partners are unknown and have to be discovered.

According to a first aspect of the present invention a method for generating a game directory on an electronic gaming device is provided. The method according to the invention comprises: querying an accessible memory for electronic games available for execution on said electronic gaming device, and generating a game directory having entries for each found playable electronic game.

Said electronic gaming device can be a mobile or a non-mobile, a wireless or a wired electronic gaming device. The gaming device may comprise an interface to a communication network.

By querying an accessible memory for electronic games available for execution on said electronic gaming device, all presently or potentially playable games may be determined. Thus, the user can recognize, which games are actually available for the terminal device. The accessible memory can be a built-in, an internal, an external or an interchangeable memory such as a multimedia card (MMC) or other flash memory devices.

An exchangeable memory device can store at least one accessible game e.g. in the form of software. The memory can be implemented as a hardware module as it is known from conventional portable game consoles. It can also be possible to detect e.g. games that are stored on memory modules actually not inserted in said device, that can be recognized e.g. via short range radio module in the console using an RFID (Radio Frequency Identification)-tag disposed on said game module.

By generating said game directory a list or a table is provided to the user, that comprises all accessible electronic games. The list or the table comprises at least one entry for each determined executable or playable electronic game.

The 'game directory' is not to be confused with a menu list for starting game applications, although in the simplest embodiments both lists may appear to be similar. It is to be noted that the game directory of the present invention is generated differently and may comprise even games or game programs that are actually not installed or may not even be available on said device.

Additionally, the game directory can comprise an arbitrary number of different entries that may depend on the available information related to the electronic games. The game directory can comprise information related to the number of game sessions in a period of time or the overall time spent on playing a certain game. The number of columns/lines may depend on different features such as number of uses or the number of preferred game partners in a game party.

The data comprised in the game directory may represent a kind of inventory list of games and their abilities.

To provide a fast overlook over the present invention, it may be pointed out that the game directory is generated by a game scanning process that looks for all games which are registered or have been registered on the game deck in the past. This may require that the normal application log files are augmented by game profile keywords describing the gaming genre, the number of players, if game level distribution is allowed to other players, when it has been installed, the statistics of usage (frequency of usage, when used for the last time). The games may be firmly installed in the terminal (e.g. in main memory or on internal hard disk) and this information is readily available. If the games reside on removable mass storage media (like flash cards or optical disks) the registration information has to be stored in the internal memory together with a label of the storage medium (e.g. its ID). Only if the mass storage medium is inserted into the device it is guaranteed that the game is actually available. With sensing technologies like RFID (radio frequency identification)-tags or with a high frequency of usage, it can be implied that the game is in the vicinity of the terminal and is available for playing even when it is actually not inserted into the device. However, RFID-tags might have to be tuned carefully so that no tagged devices are detected which are actually not games.

In an example embodiment of the present invention said method further comprises querying said accessible memory for context data related to said electronic games, and including said context data into said game directory.

Thereby the inventory list of games can be extended to other properties of the different games and their abilities. Said context data can be can be stored as separate and related entries in said game directory. The context data can comprise e.g. multi-player ability, or a list of preferred or (usually) available game pals. Said query for context data can be performed simultaneously with said first query.

That is, the game directory can be generated and in a second step additionally context data are determined providing a basis for generating e.g. game statistics. The context data may be generated by a comparing operation between actually determined data and pre-stored game directory data. Thus it may be possible to determine or generate the overall game time of a single user or even for all users.

In another example embodiment of the present invention said context data comprise information related to a multi-player ability of said electronic games. This enables a user to recognize at a single glance how many players are required to play a certain game listed in the game directory.

Conventionally, two different kinds of multi-player games for game consoles are known. The first kind comprises games that can be played from a single game console of from a single game module, and the other ones require a game module or a game software at each game console. This information is especially useful if the game directory entries are to be transferred to the game consoles of other potential game partners.

In another example embodiment of the present invention said method is characterized in that said game directory comprises only multi-player enabled electronic games. When including information about the possible number of players in a game directory, a multi-player game directory and/or a single-player game directory can be generated. The multi-player game directory can e.g. include different multi-player options for a multi-player game mode. The game may be provided for example with different colors for different availability states of games. Different colors, text styles or tallies can indicate e.g. the (maximal or a minimal) number of players. It is also possible to sort the games according to a 'single license' or 'a multi license' gaming mode.

Games provided with the single license mode do not need to be installed on every connected device as long as one terminal can deliver the content via the link cables to the others. Special games provided with the multi license mode can only be played with multiple game cartridges.

According to another aspect of the present invention a method for maintaining a game directory is provided. In the method a game directory generated according to the above specification can be maintained by determining context data related to said electronic games in said game directory, if an electronic game is executed, and storing said context data in said game directory.

With the maintenance option the data in the game directory can represent a kind of 'log directory' for game activities. It may be noted when determining context data related to said electronic games in said game directory, if and when an electronic game is executed, called, started or activated, even if said context data are not considered in the game itself. For example the game directory may store the time of day, preferred environmental conditions, preferred game partners, preferred connection types and the like. In case that the game console is implemented in a mobile telephone it is also possible to access the properties of a certain cell of a cellular telephone or communication network in said game directory. The context data can be used to generate additional entries in said game directory. The number of different entries may not be restricted.

By storing said context data in said game directory, a whole set of statistical data can be made accessible for a long time.

This embodiment enables not only the generation but also the maintenance of the game directory. It is possible to answer questions such as 'Who has played which game via what connection how often, where and when?'.

In case of multi-player games that have been transferred from another game device it is also possible to include games in the game directory that are actually not stored in said device. The game directory can therefore comprise e.g. a note multi-player game 'XXX' played 5 times received from device/person 'YYY'. Thus, a user can access information how to play a game even is this game is actually not stored/accessible at the device, for example by outputting a list of persons/devices that may serve as game software source.

According to another aspect of the present invention a method for setting up a multi-player game party in a gaining device connected to at least one other gaming device is provided. The method, is based on using a game directory of the preceding description and comprises retrieving said game directory that comprises game related entries and transfer entries of said game directory to said at least one other gaming device.

By retrieving said game directory, game related entries are made available for further processing. By transferring entries of said game directory or by transferring the whole game directory to said at least one other gaming device, the users of the other game devices can see which games may be available for a multi-player gaming session.

The other game partners can easily recognize how many and which game partners can be considered for a certain game. Another advantage resides in that the user can see which game he has to purchase to find the maximal number of possible game partners. If a user can not decide which of two e.g. race games is best to be purchased, the user can simple determine how many potential game partners will result from each of said games. A user can also send a message to a user who has both games and can therefore ask him which he considers to be best purchased. A transfer of (at least the game entries) of the game directory can provide the information which germs are available for another user.

In another example embodiment of the present invention said transferring of the game directory entries further comprises, extracting a subset of said entries from said game directory and transferring said subset of extracted entries only.

By selectively selecting only a subset of said entries from said game directory, and transferring said subset of extracted entries only for example only multi-player enabled games can be transferred to other users. It is also possible to extract only the entries of games that can be played with only a single module (i.e. a single license playable multi-player game) or only the games that can be played when each player has inserted a module (i.e. every player needs a license game).

In another example embodiment of the present invention said extracting of electronic game entries is performed according to user defined rules.

Thereby, a user may hide the presence of certain games on his game console to other potential players. If e.g. a user has played e.g. 'Tetris' for too long and definitively does not want to play 'Tetris' any more, he can put up a rule to prevent that information related to the presence of 'Tetris' is transferred to other potential game partners. It may also be possible to transfer the presence of a game with a 'do not want' flag. To prevent that other players suggest playing this game.

A local game discovery is sketched where the terminal can scan the complete terminal for games and also the subset of games suitable for multiparty gaming. This scanning process may include the analysis of (removable) mass storage media (like e.g. MMC cards) which can be inserted into the device, but might only be available in the vicinity of the device.

The availability of the mass storage containing the game might be indicated by the user himself or e.g. by RFID (Radio Frequency Identification tag). In case of user indication the user might be asked by the terminal when he replaces a game memory card if the replaced game should be entered into an "available games list". This is useful in the case that a player only has borrowed or tested a game a while ago and does not want this game to appear on the directory of available games.

RFID technology can be used to indicate that the game software is available in the vicinity. For this purpose game storage devices are equipped with an RFID tag and the gaming device contains an RFID reader. As long as the game card is in RFID range (some centimeters up to some decimeters) the game(s) on this specific game card is listed as an available game in the game card.

The person starting a 'multiparty game request' (in the following called gaming host) can edit the list of multiparty games and send it to potential gaming partners who are selected from a specific address directory view, the player directory (which man indeed constitute a part of the game directory). Apart from listing the persons capable of gaming, the game directory may contain the history, i.e. which games have been played at what time between which persons and the gaming host.

In yet another example embodiment of the present invention said method further comprises receiving game directory entries from said at least one connected gaming device and storing said game directory entries.

By receiving electronic game directory entries from said at least one connected gaming device and storing said game directory entries, a device can not only transfer game related data but can also receive game related data. This enables the user to find out which games can be provided by the other devices. By the two-way connection and transfer a user can exchange data and can finally determine which games are actually available.

In yet another example embodiment the method further comprises displaying said electronic game entries from said game directory on a display of said mobile electronic gaming device. That is the user can visually access all transferred game directory entries, both the game directory entries from his own game directory and the received game directory entries from other game console devices.

In another example embodiment of the present invention said game directory entries and said selection data are displayed in form of a "whiteboard" which is preferred form of display of visual data. The 'whiteboard for game settings functionality' enables the users to economize the usually necessary audio connection in a distributed gaming scenario. The whiteboard is supposed to be displayed on each of the connected gaming devices before the multi-player game itself is going to be started. The players can user this whiteboard to indicate their preferences and choices to select a game and even to select certain game settings. The whiteboard functionality informs immediately the other players (with an activated whiteboard) so that every other player is immediately informed about the selections of all the other players, if any setting is changed. The whiteboard may be implemented in form of an HTML (Hypertext markup language) or a WML (wireless markup language) page.

The entries of the game directory can be displayed in form of a whiteboard, wherein each entry for a game can be accessed e.g. via a menu point. It is also possible to display the whiteboard in custom generated lists, wherein each of the entries may be graphically related to another entry.

The whiteboard functionality for the game settings means that every player sees the same image on the display and all participants can make their settings while knowing how the others react. The whiteboard can be part of a game selector application, which constantly updates the screen whenever one of the participants is making modifications to games settings.

The game settings may be also stored as a web page on a host terminal. The settings are integrated into one page via a web application, which is activated by a web server running on the host. A web browser on all connected clients may render the display of the settings as well as their modification. A web site push operation is initiated to all gaming partners whenever a connected client submits a change to this page, which may be implemented as a WEB form.

The negotiation of gaming roles and options before entering the game sketched in a whiteboard approach has additional advantages: every player can instantaneously see the choices that the other players are making on the respective screen. This concept eliminates the uncertainty what the other players are doing to prepare the game and when to start the game. Moreover it includes all games in every device or console into this process.

In combination with the above steps for generating the game directory, the present invention may be implemented in an embodiment such as: first scanning for available games on other devices, selecting games and generate a whiteboard for game settings, i.e. each player can see the game (settings) chosen by the other players. Thereby, the scanning for available games on other devices may be performed e.g. via short-range communication. A transfer of game software may accomplish the game selection.

In another example embodiment said method further comprises receiving selection data related to said displayed electronic game entries and displaying said selection data on said display.

By receiving selection data e.g. a user selection can be received from the user of the device or from a user of a connected device. The selection or better selection data can be a received on a game console, i.e. the selection may be received or actively requested from a user. Thereby, the selection of a user or the selection of a potential game partner can be made accessible to all connected potential game partners.

The selections can be displayed together with said game directory entries. The selections may be displayed by using e.g. different colored tallies, wherein each selected entry is marked with a marker or a short line.

In yet another example embodiment of the present invention the method further comprises receiving and installing a game directory generation and game selection application. That is a piece of software is transferred from one game console to another game console, to be installed at the addressee console, to perform the game directory generation method. Thereby, a user can initiate another game device to generate a game directory and transfer game directory entries. This may be accomplished by a user confirmation, to prevent that device starts sending user related data without being noticed by the user. This implements that game directory generation and game selection application is transferred from another device. This device may be a server, or another game console. When the application is provided with a self-detection and user confirmation algorithm, the game directory generation and game selection application can be spread in a fast manner in a certain area or in a certain game community.

The game terminals require the installation of a game scanning and selection application, which is required to be present in all game terminals involved. To provide a fast access to the benefits of the present invention, a computer program written in a platform independent language may provide the game scanning and selection application.

In another example embodiment of the present invention said method further comprises sending a request to retrieve and transfer said game directory entries. Thereby, a user can request other devices to send the actual game directory entries to provide a potential game partners with enough data to start a multi-player game.

In another example embodiment of the present invention said method further comprises sending a request to retrieve and transfer said game directory entries. Thus, a device can actively poll game related data from other devices. The combination of receiving and transferring requests enable each of said devices to start or join the proceedings to initiate a multi-player game set-up. Thus the method may comprise the generating of a game directory, the requesting of game directory data, the transfer and installing of a game directory generation and game selection application, the extraction and transfer of game directory entries, and the selection and transfer of said selection data. Thereby a game console is provided with the ability to receive game data and selection data and to display selection data and game data to a user. Thus, a device can present any kind of information necessary to decide which game a user wants to play with which person.

In yet another additional example embodiment of the present invention the method further comprises sending a request to start a game to any of said other connected game devices according to said selection data. The preceding specification is based basically on the information transfer to enable a user to decide which game he wants to play and with whom. If he user has decided which game he wants to play, he can initiate the messaging necessary to start playing.

The complete game initiation can be handled by a centrally installed application and can comprise the above-mentioned game scanning process as well as the presentation of results to the users. It presents a list of multi-player games and also the information if it can be transferred to other terminals in case the partners do not own this game. The game selector application may also handle the transfer of game levels to the clients later in time.

This transfer requires fast data connections (like Bluetooth, Wireless-LAN or Wideband-CDMA or UWB) in order to transfer megabytes of data without too long waiting time. The data transfer and its progress can be indicated to the users as visual feedback information (such as e.g. by a progress bar). The game selector application on the client terminals has the task to compare the list of games offered by the host with the available list of games on the client terminal. The client user may then only select games, which are also installed on the client or can be transferred from the host.

According to yet another aspect of the invention, a software tool is provided comprising program code means for carrying out the method of the preceding description when said program product is run on a computer or a network device.

According to another aspect of the present invention, a computer program product downloadable from a server for carrying out the method of the preceding description is provided, which com rises program code means for performing all of the steps of the preceding methods when said program is run on a computer or a network device.

According to yet another aspect of the invention, a computer program product is provided comprising program code means stored on a computer readable medium for carrying out the methods of the preceding description, when said program product is run on a computer or a network device.

According to another aspect of the present invention a computer data signal is provided. The computer data signal is embodied in a carrier wave and represents a program that makes the computer perform the steps of the method contained in the preceding description, when said computer program is run on a computer, or a network device.

According to another aspect of the present invention, there is provided an electronic gaming terminal device. The electronic gaming device comprises a first storage, a processing unit, a user interface with a display and a user input device and a second storage. The first storage is provided to store programs an execution programs in a conventional manner. The processing unit is connected to said storage to access stored data in a conventional manner. Said user interface is connected to said processing unit to perform user in and outputs in a conventional manner. Said user interface comprises at least a display and a user input device.

In the electronic gaming device said processing unit is configured to query said first storage for electronic games stored or available for execution on said electronic gaming terminal device and generate a game directory comprising entries that are related to games found during said query. To store said generated game directory said electronic gaming terminal device further comprises a second storage. The first and the second storage may each be provided by an interchangeable or by a built-in storage. Preferably, said first storage is changeable and said second storage is built in. Said stored games can be provided as game software, stored e.g. in an interchangeable memory module.

Basically, the electronic device is configured to generate a game directory that can provide the user by itself with information about his personal gaming behavior. It can also provide indications of preferred games. The first aspect is to provide a gaming device that is capable of generating and maintaining a game directory, in the style of a log file.

In an example embodiment of the present invention said electronic gaming device further comprises a communication interface. The communication interface is connected to said processing unit, to connect said device to other electronic gaming devices. In this embodiment said processing unit is configured to set up connections to other electronic gaming terminal devices, select or extract entries of said game directory, and exchange game directory entries with said connected electronic gaming devices, and display said game directory entry on said display. The communication interface provides a terminal device characteristic to the gaming device. This embodiment is provided to enable the device to use the game directory in a game party set-up procedure.

In another example embodiment of the present invention said electronic gaming terminal, is a mobile electronic gaming terminal. A mobile gaming terminal may include a mobile electronic device having a wireless communication interface. The wireless communication interface can be an infrared (IR) interface or a radio interface. In case of a radio interface this may be embodied as a W-LAN-, a Bluetooth- or a cellular communication network based interface.

According to another aspect of the present invention an electronic gaming system is provided that comprises at least two electronic game terminals according to the preceding description. The terminal devices can communicate via communication interfaces and generate game directories and exchange game directory entries. This gaming system enables the respective users to perform a gaming party set-up procedure described in the preceding description. When using the system each of the users can use a whiteboard to interact with the other users to post his selections and to receive the selection of the other users of the systems.

A single device can only provide statistical data (i.e. the game directory) related to the gaming history the device or the user. In connection with the other connected gaming devices and the 'whiteboard concept' a game party set-up procedure can be provided that requires no extra audio connections to negotiate a multiparty game to be played.

BRIEF DESCRIPTION OF THE DRAWINGS

In the following, the invention will be described in detail by referring to the enclosed drawings in which:

FIG. 3 is an example of a game directory according to an embodiment of the present invention, FIG. 4 displays an example of a whiteboard during a game party set-up procedure according to an embodiment of the present invention, FIG. 5 displays another example of a whiteboard during a game party set-up procedure according to an embodiment of the invention, and FIG. 6 displays another example of a whiteboard during a game set-up procedure according to another embodiment of the present invention.

Figure 1:
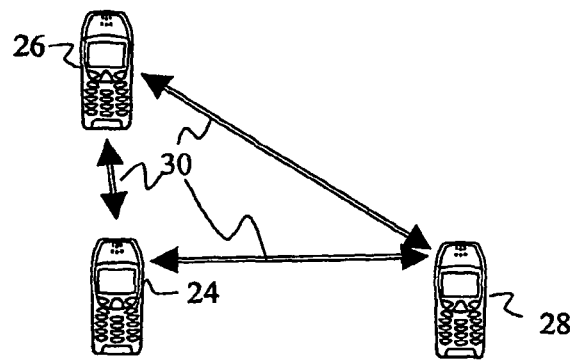
FIG. 1 is a an example of network environment capable of using the present invention.

In the following, the invention will be described in detail by referring to the enclosed drawings in which:

FIG. 1 depicts an example of network environment capable of using the present invention. In the figure there are three mobile game terminals 24, 26 and 28 depicted that are connected via wireless connections 30. The distance between the single devices may exceed the distance usually accepted for vocal communication. Conventionally, in such a network structure there is no simple way provided to negotiate with a number of potential game partners about a game to be played and start to play a game. Conventionally, phone calls and short messages provide enough communication to suppose one or two games.

Figure 2:
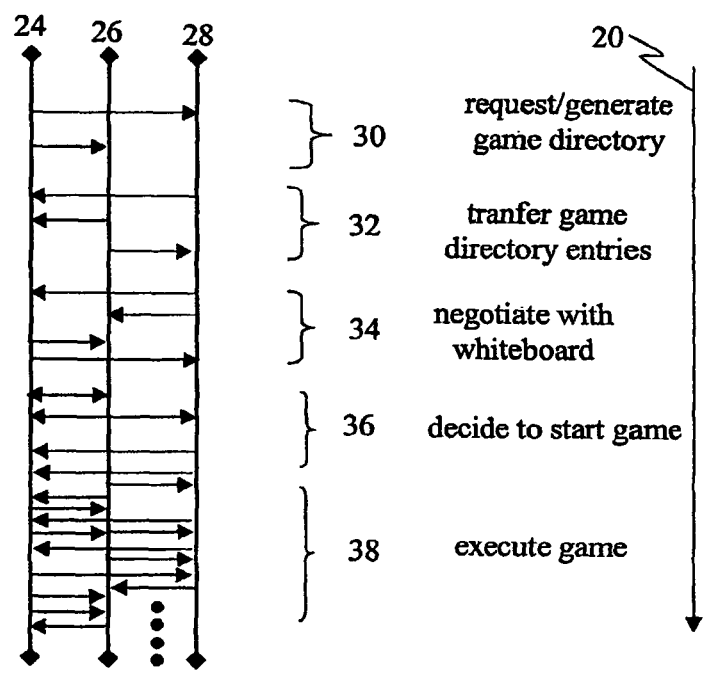
FIG. 2 is an example of a game party set-up procedure according to an embodiment of the present invention.

FIG. 2 depicts an example of a game party set-up procedure according to an embodiment of the present invention is depicted as a flowchart diagram. As in FIG. 1 there are three game terminals 24, 26 and 28 depicted. The time passes in the direction indicated by time axis 20.

The game host 24 decides that he wants to play with one or more friends 26, 28. The game partners 26, 28 might be in the vicinity (e.g. within Bluetooth range) or connected via another wireless network (cellular, W-LAN, etc.). It is unlikely that the setup of the game can be discussed face-to-face, e.g. due to a large physical distance between the garners. It may also be impossible to communicate via a voice connection since conversation may be blocked due to circumstances, such as a crowded bus, a noisy environment, or sleeping persons in the vicinity, which are not to be disturbed.

The player or user of the device 24 can induce a scan for locally available games e.g. by a dedicated key shortcut and the game deck returns the available games as a list with especially marked multiparty games. These games may either be installed permanently in the device or may have been played in the past and are available on removable mass storage media (like e.g. MMC cards). The user can now deselect games that he does not want to offer to the other garners. The user may also select the games that he wants to offer to the other garners. Some of those games may require the availability of a licensed installation, some may be allowed to be distributed to connected player, provided that (at least) one player contains the license. A license can be granted by providing a copy protected physical medium or an electronic authorization, e.g. via a digital rights management mechanism.

The suitable game partners can be selected from the game directory or an address directory with a special view on available game deck owners. The selected partners are notified about the gaming request 30, either via Bluetooth or via cellular in order to receive a response.

Every selected device 26, 28 related to the selected players receive the list of games from the host 24. On the client side the same game scanning process as on the host side is initiated and finally only the subset of games that is allowed to be played is displayed to the client. This means that all games which can be distributed by the host are transferred and shown 32 and in addition those games which are licensed to the host 24 as well as to the clients 26, 28. The different clients 26, 28 select those games, which they would like to play and send the responses back to the host 24. The host 24 receives the statistics of the selection, i.e. how many and who want to play the different games and selects one game as well as the client garners. As a response the clients are informed 36 that they are part of the game or will not join the game and who else is playing as well. For the participants a whiteboard 34 is depicted where all gainers can enter their gaming options and are visible to all others instantaneously. When all have made their selections the gaming host starts the game 36. In the following the game is executed 38 with the host 24 and all clients 26, 28 that have joined the party.

In FIG. 3 an example of a game directory according to an embodiment of the present invention is displayed. The game directory can be generated by performing a scanning procedure at the terminal of the user who wants to play with a player at another game gaming device. In the scanning procedure the game software accessible at the gaming device of the user is determined. The accessible game software is collected in a file that represents the game directory. In the figure a pat of the game directory displayed on a display 8. The game directory comprises three columns 10, 12 and 14. In the first column 10 three games are depicted. In the second column 12 the maximal number of players in a multi-player mode is depicted. The fist game can be played with up to 5 players. The second game can be played with up to three players, and the third game can be played with up to 4 players. In the third column 14 the number of game rounds already played is depicted. The user has played the first game seven times, the second game fifteen times and has not yet played the game number three.

The game directory can be used to generate any kind of statistical value, if the game directory also comprises e.g. timing data. The game directory can comprise columns for a preferred time of day for each of said games, a preferred game partner or even a preferred location for gaming.

The user may select a number of games he actually wants to play in a multi-player mode, and transfers the list to (at least one) potential game partner. In respond to the transfer of the game data the gaming software that is present on the addressee device is scanned for matching games and other multi-player enabled games.

The potential game partner can be in close vicinity or may be only connectable via a communication network, such as a telephone network. To simplify the connection set-up to a potential game partner, e.g. a 'buddy-list' to be queried may be used. The buddy list may also be embodied as a part of the game directory. This may e.g. be implemented by a fourth column comprising entries for every former game partners a game has been played with.

If a match between the game software on both devices is detected, the searching player may start a request to the one or more potential players, if they want to start a game round together.

FIG. 4 depicts an example of a whiteboard during a game party set-up procedure according to an embodiment of the present invention. The present invention also provides a 'whiteboard for game settings'. This whiteboard can be used to negotiate a game between the potential game partners. The whiteboard can also be used to select the respective game settings for each user. In both cases the whiteboard is displayed on each of said terminals, by using the whiteboard the (potential) game participants can select the game to be played or the game settings. The whiteboard ensures that each change of the settings is automatically broadcasted to each of the other players. Thus, every player is immediately informed of the selection of changes of the settings performed by each of the other players. The whiteboard may be exchanged by using e.g. a WEB-page.

In FIG. 4 a whiteboard for the selection o/negotiation of a game between different players is depicted. The whiteboard comprises three columns of a game column 10, a player column 16 and a selection column 18. The first column 10 comprises the four available games numbered 1 to 4. The last column 16 comprises the four available potential players similarly numbered 1 to 4. The selection column 18 represents on one hand availability information, and on the other hand selection information. The interrupted lines represent availability lines, i.e. if at least a dotted line connects a game and a player, the player can directly access said game software. For example the games 1 and 2 are present on the gaming device of player 1 and player 4. Game 3 is present on the gaming device of players 1, 2 and 4. The bold lines drawn from players 1, 4 to game 2 and from player 2 to game 4 represent primary selections. In the depicted whiteboard the users can express their personal preferences by the thickness of the connection lines between the player and a game. The fine drawn line between player 1 and game 3 represents a second selection, i.e. player 1 would prefer to play game 2, but would also accept game 3 as an option, if no one would want to play game 2.

It is may also be possible to delete, games that are not longer available from the game directory and/or from the whiteboard. It can also be possible to automatically generate a preference profile on the basis of context data such as the number of actually played game rounds (see also the column 14 in FIG. 3).

The depicted whiteboard can be generated on the basis of the game directory depicted in FIG. 3. To provide the data for the whiteboard the scan process may be repeated at each request and the game directory can be deleted after each selection. It may be more efficient to store a game directory of each game accessible on each of said terminals, e.g. in the form of a homepage.

When using a game directory, it may happen that not all game entries in the game directory are actually instantaneously available, but may be only available in form of a memory card such as an MMC (multi media card), which has to be inserted into the gaming terminal device. It therefore may have to be considered during the generation of the game directory or the whiteboard that games may be comprised in the game directory, which may actually not inserted, but have been played in the past. This is especially useful if it can be estimated that the user can access the memory device that holds the game. This may be performed e.g. by a context data analysis.

The availability of the mass storage containing the game can also be indicated by the user himself or for example by an RFID (Radio Frequency Identification tag) based system. In case of user indication the user can be queried when he replaces a game memory card if the replaced game should be entered into an "available games list". This useful for the case that a player only borrowed or tested a game a while ago and does not want for other reasons a game to appear on the directory of available games.

The RFID technology can be used to indicate that the game software is available in the vicinity, even if said game software is stored on a mass storage actually not inserted in said game terminal. For this purpose game mass storage devices can be provided with an RFID tag and the gaming device can be provided with an RFID reader. As long as the game card is within RFID range (some centimeters up to some decimeters) the game(s) on this specific game card is listed as an available game in the game whiteboard. The user might also be asked on game card removal if this game should be entered to the list of available games, if e.g. a game inside the game slot can no be read by the RFID reader, because of e.g. Faraday cage effects in the game slot.

FIG. 5 depicts another example of a whiteboard during a game party set-up procedure according to another embodiment of the present invention. In FIG. 5, the present invention also provides a 'whiteboard for game settings'. In FIG. 5 this whiteboard can be used to negotiate a game between the potential game partners.

FIG. 5 is an example of a whiteboard, which can be displayed on al terminals after e.g. player P1 has scanned other available terminals for available games. The players can decide to play G2/Icehockey all together, but if P2/Sunny does not want to join icehockey P1 sand P3 can decide to play Football without P2 or any other selection is made. All potential players are informed on the whiteboard about the other players selection immediately. Player. P1 can initiate the selected game after the players has mad the selection and the game connections are set up automatically then.

The whiteboard comprises a player list 40 and an available game list 42. The player list 40 comprises a player field for any player connected, actually the player list does not represent a player but rather a game terminal device list. The game list 42 comprises any game that is available for at least one of said game terminal devices.

The player list 40 comprises at least one player (the owner of said game terminal device). The game list 42 comprises at least the games that are available for the present game terminal device (which actually may be none).

Both lists span up a table or a matrix comprising fields 44 that each are related to a single player and a single game. In FIG. 5 each entry in the player list 40 is related to a column and each game entry in the games list 42 related to a row in the list. The table comprises at least to one column for the owner of the game device.

Each field in the table or whiteboard is then filled in with a sign 46 indicating if a game is available on a certain game device or not. In the figure this sign is embodies as an 'X'. Considering only the table and the signs 46, it is clearly visible for anyone looking at said whiteboard, which electronic game is actually available at which gaming device.

In FIG. 5 there are also depicted additional elements 48 that can be used to visualize preferences of the single players. The elements symbolize 'emoticons' that symbolize emotions in icons, to visualize an actual preference of a user to participate in a game. According to the emoticons the players P2 and P3 i.e. 'Sunny' and 'Berny' are willing to play the game G3 'Solar travel', while Player P3 'Jessy' is preferring to play another game than G4 'Moon Race'

In FIG. 5 a negotiation of a game between different players can be performed by using the depicted emotions. It also possible to use animated or boldly depicted 'X' symbols or the like. Primary or secondary selections such as described in FIG. 4 may easily be presented by using emoticons.

The big outlined 'X' sign 50 at the field related to P1 and G4 represents a master game license for the game 'Star Ways' present at Jessy's game terminal. The small outlined 'x' signs 50 at the fields related to the players P2, P3 and G4 indicate that these games are indirectly available from player P1. It is also possible to indicate games in the vicinity by signs such as e.g. outlined, underlined or encircled, crosses, stars, polygons or symbols.

It is may also be possible to automatically or manually delete games from the whiteboard that are not longer available. It can also be possible to automatically generate a preference profile on the basis of context data such as the number of actually played game rounds (not depicted in FIG. 5). It is also possible to indicate a minimum game partner number in said whiteboard e.g. by small number indicated as indices.

It may be noted that any kind of sorting algorithm may be applied to sort the entries in the lists according to the alphabet, according to player preferences or according to maximal possible player numbers. It is also possible to adapt the depiction of said whiteboard according to the available display space. It is also possible to adapt the depiction of the table only to an area of interest (e.g. by suppressing game list entries that are not available for the device of the respective user).

It may also be noted the RFID tag based procedures discussed in FIG. 4 can also be applied for generating the whiteboard of FIG. 5.

FIG. 6 displays another example of a whiteboard during a game set-up procedure according to an embodiment of the invention: The whiteboard principle is also applicable for to selecting the respective game settings for each user, if a group of uses has agreed to play a certain game. In this case the whiteboard is displayed on each of said terminals, by using the whiteboard the game participants can select the game settings. The whiteboard ensures that each change of the settings is automatically broadcasted to each of the other players. Thus, every player is immediately informed of the selection of changes of the settings performed by each of the other players.

In FIG. 6 the users P1, P2 and P3 of FIG. 5 have agreed to play 'Star Ways'. In this game it is supposes that each user can select a single space ship and a single game character, and that each character and each ship can be selected only once. The characters are sorted in a character list 52 and the space ships are provided in a space ship list 54. Similarly to FIG. 5 the combination of the two lists span up a two dimensional list. If a player e.g. P3 selects a character and a ship e.g. 'Luis WU' and the 'Hot Needle', both the ships and the character are not longer available for the other players P1 and P2. The crossing out with the bars 58 indicates this unavailability. The player P1 has already selected a character and player P2 has already selected a ship. The crossing out with the bars indicates this unavailability of the ship and the character. The whiteboard may be exchanged by using e.g. a WEB-page.

The principles of the present invention can also be applied, if a master version of a game software is detected at one of the devices that can download slave versions of a multi-player game for multi-player gaming. In this case it would be sufficient to find a terminal that can download, install and execute the slave version of the game software. Similarly such a 'master software' may also appear on the whiteboard, if it is detected at one of the connected devices.

The present invention provides the following advantages:
  The setup of multi-player games is simplified significantly by scanning all available games and easy selection of the gaming partners. It is e.g. very easy to resume a games session by looking for the history of games in the game directory.
  The phase of setting games options is very transparent by using the whiteboard concept, as all players have full visibility what is going on at the other player's devices in realtime.
  In the whiteboard concept all gainers are equal, no one has the lead in determining the gaming parameters.
  The wireless sharing of allowed games or game levels, extends the gaming opportunities and can be used to attract new users to specific games.

Al the benefits can be provided by only loading a and installing a game scanning and selection application which is required to be present in all game terminals involved.

In contrast to conventional approaches, the present invention can be applied to any kind of interconnected network gaming. The methods can be applied in cellular network gaming (CNG), and for game in initialization in short range communication devices based on Bluetooth, WLAN, infrared.

It also possible to apply this invention to a home console environment, if e.g. the home console is connected to a communication network and can determine different available games by user e.g. RFID-tags to determine all available multi-player games in the vicinity.

This is also possible if e.g. the game console can only access a single game each time because the console comprises only a single interface for a mass storage for accessing game software.

In another implementation the game directory can be created in a conventional game console and can be stored on a persistent storage module (such as a memory module or a built-in mass storage such as a hard disc drive) usually provided to store game scores and game levels.

It may be noted that the present invention can also be readily applied to any kind of network configuration, with or without a dedicated game server. The present invention is especially beneficial, if a dedicated game server is not available.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently, various options of implementing the invention as determined by the claims, including equivalent implementations, also belong to the scope of the invention.

The invention claimed is:

1. A method comprising:
    detecting, by a first gaming device, a second gaming device;
    determining one or more available games within the first gaming device;
    causing, at least in part, a communication, by the first gaming device with the second gaming device, to determine one or more available games within the second gaming device that are common to the one or more available games within the first gaming device;
    determining a game list that specifies the common games;
    determining participant information relating to the first gaming device and the second gaming device; and
    causing, at least in part by the first gaming device, presentation at the second gaming device of one or more game identifiers of the common games and the participant information.

2. A method of claim 1, further comprising:
    causing, at least in part, a querying of the second gaming device for context data related to the common games; and
    causing, at least in part, inclusion of the context data in the game list.

3. A method of claim 1, wherein the context data comprises information related to a multi-player ability of the common games.

4. A method of claim 1, wherein the game list comprises the common games that are multi-player.

5. A method of claim 1, wherein the one or more game identifiers of the common games and the participant information are presented to the second gaming device as a whiteboard.

6. A method of claim 2, further comprising:
    causing, at least in part, a presentation of the context data related to the common games to the first gaming device and the second gaming device as a whiteboard.

7. A method of claim 1, further comprising:
    causing, at least in part, a transmission of a request from the first gaming device to start a game to the second gaming device according to one or more selected entries from the one or more game identifiers of the common games and the participant information.

8. An apparatus comprising:
    at least one processor; and
    at least one memory including computer program code for one or more programs,
    the at least one memory and the computer program code configured to, with the at least one processor, cause the apparatus to perform at least the following,
    detect a gaming device;
    determine one or more available games within the apparatus;
    cause, at least in part, a communication with the gaming device to determine one or more available games within the gaming device that are common to the one or more available games within the apparatus;
    determine a game list that specifies the common games;
    determine participant information relating to the apparatus and the gaming device; and
    cause, at least in part, presentation at the gaming device of one or more game identifiers of the common games and the participant information.

9. An apparatus of claim 8, wherein the apparatus is further caused, at least in part, to:
    cause, at least in part, a querying of the gaming device for context data related to the common games; and
    cause, at least in part, inclusion of the context data in the game list.

10. An apparatus of claim 8, wherein the context data comprises information related to a multi-player ability of the common games.

11. An apparatus of claim 8, wherein the game list comprises the common games that are multi-player.

12. An apparatus of claim 8, wherein the one or more game identifiers of the common games and the participant information are presented to the gaming device as a whiteboard.

13. An apparatus of claim 9, wherein the apparatus is further caused, at least in part, to:
    cause, at least in part, a presentation of the context data related to the common games to the apparatus and the gaming device as a whiteboard.

14. An apparatus of claim 8, wherein the apparatus is further caused, at least in part, to:
    cause, at least in part, a transmission of a request to start a game to the gaming device according to one or more selected entries from the one or more game identifiers of the common games and the participant information.

15. A non-transitory computer-readable storage medium carrying one or more sequences of one or more instructions which, when executed by one or more processors, cause an apparatus to at least perform the following steps:
    detecting a gaming device;
    determining one or more available games within the apparatus;
    causing, at least in part, a communication with the gaming device to determine one or more available games within the gaming device that are common to the one or more available games within the apparatus;
    determining a game list that specifies the common games;
    determining participant information relating to the apparatus and the gaming device; and
    causing, at least in part, presentation at the gaming device of one or more game identifiers of the common games and the participant information.

16. A non-transitory computer-readable storage medium of claim 15, wherein the apparatus is caused, at least in part, to further perform:
    causing, at least in part, a querying of the gaming device for context data related to the common games; and causing, at least in part, inclusion of the context data in the game list.

17. A non-transitory computer-readable storage medium of claim 15, wherein the context data comprises information related to a multi-player ability of the common games.

18. A non-transitory computer-readable storage medium of claim 15, wherein the game list comprises the common games that are multi-player.

19. A non-transitory computer-readable storage medium of claim 15, wherein the one or more game identifiers of the common games and the participant information are presented to the gaming device as a whiteboard, and the apparatus is caused, at least in part, to further perform:
  causing, at least in part, a presentation of the context data related to the common games to the apparatus and the gaming device as a whiteboard.

20. A non-transitory computer-readable storage medium of claim 15, wherein the apparatus is caused, at least in part, to further perform:
  causing, at least in part, a transmission of a request to start a game to the gaming device according to one or more selected entries from the one or more game identifiers of the common games and the participant information.

\* \* \* \* \*